US008699386B2

(12) United States Patent
Chen et al.

(10) Patent No.: US 8,699,386 B2
(45) Date of Patent: Apr. 15, 2014

(54) H-ARQ TIMING AND BACKHAUL SUBFRAME CONFIGURATION FOR TDD RELAY IN LTE-A

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 13/212,084

(22) Filed: Aug. 17, 2011

(65) Prior Publication Data

US 2012/0044841 A1 Feb. 23, 2012

Related U.S. Application Data

(60) Provisional application No. 61/374,891, filed on Aug. 18, 2010.

(51) Int. Cl.
*H04J 3/00* (2006.01)
(52) U.S. Cl.
USPC ........... 370/280; 370/294; 370/322; 370/326; 370/337; 370/348; 370/442
(58) Field of Classification Search
USPC ......... 370/276–282, 293–296, 315, 321, 322, 370/326, 347, 348, 442
See application file for complete search history.

(56) References Cited

U.S. PATENT DOCUMENTS

| | | | |
|---|---|---|---|
| 2010/0103860 A1* | 4/2010 | Kim et al. | 370/315 |
| 2010/0265870 A1* | 10/2010 | Cai et al. | 370/312 |
| 2011/0096701 A1* | 4/2011 | Lin | 370/280 |
| 2011/0267997 A1* | 11/2011 | Seo et al. | 370/280 |
| 2012/0026935 A1* | 2/2012 | Park et al. | 370/315 |
| 2012/0163335 A1* | 6/2012 | Chung et al. | 370/330 |
| 2012/0218964 A1* | 8/2012 | Park et al. | 370/329 |
| 2012/0320816 A1* | 12/2012 | Kim et al. | 370/315 |
| 2012/0320819 A1* | 12/2012 | Kim et al. | 370/315 |

OTHER PUBLICATIONS

HUAWEI: "Overview and text proposal for type 1 relay TDD frame structure, R1-091808", 3GPP TSG RAN WG1 Meeting 57, May 4, 2009, XP002662404, Retrieved from the Internet: URL: http://www.3gpp.org/ftp/tsg-ran/wgl-rl1/TSGR1_57/Docs/ [retrieved on Oct. 28, 2011].
International Search Report and Written Opinion—PCT/US2011/048307—ISA/EPO—Nov. 9, 2011.

(Continued)

*Primary Examiner* — Alvin Zhu
(74) *Attorney, Agent, or Firm* — Arent Fox LLP

(57) ABSTRACT

A method for wireless communication is provided, at a half-duplex node operating in TDD mode and may be used with an eNB in an LTE system. The method comprises receiving a configuration of a first set of subframes for a first link communication containing at least one downlink subframe and at least one uplink subframe. A second set of subframes for a second link communication is then determined. This second set includes at least one backward compatible downlink hybrid automatic repeat request process and at least one backward compatible uplink hybrid automatic repeat request process utilizing a second set of subframes. Communication begins with a first set of nodes using the first link and the first set of subframes. A second set of nodes using the second link and the second set of subframes is also used for communication. Communication to a legacy node is also supported.

32 Claims, 14 Drawing Sheets

Table 1 Allowed Backhaul Subframe Configuration for TDD Configuration #3

| TDD UL-DL Configuration | Un DL:UL ratio | Un subframe configuration index | Subframe n | | | | | | | | | |
|---|---|---|---|---|---|---|---|---|---|---|---|---|
| | | | 0 | 1 | 2 | 3 | 4 | 5 | 6 | 7 | 8 | 9 |
| | | | D | S | U | U | U | D | D | D | D | D |
| 3 | 1:1 | 0 | | | | √ | | | √ | | | |
| | 2:1 | 1 | | | | √ | | | √ | | | √ |
| | 3:1 | 2 | | | | √ | | | | √ | √ | √ |
| | 3:2 | 3 | | | √ | √ | | | | √ | √ | √ |

(56) References Cited

OTHER PUBLICATIONS

Nokia et al., "Considerations on TDD Relay" 3GPP Draft; R1-090734, 3rd Generation Partnership Project (3GPP), Mobile Competence Centre; 650, Route Des Lucioles; F-06921 Sophia-Antipolis Cedex; France, No. Athens, Greece; 20090203, Feb. 3, 2009, XP050318598, [retrieved on Feb. 3, 2009].

QUALCOMM Incorporated: "Timing for TDD relays" 3GPP Draft; R1-104816 Timing for TDD Relays, 3rd Generation Partnership Project (3GPP), Mobile Competence Centre; 650, Route Des Lucioles F-06921 Sophia-Antipolis Cedex; France, vol. RAN WG1, No. Madrid, Spain; 20100823, Aug. 19, 2010, XP050450200, [retrieved on Aug. 19, 2010].

* cited by examiner

Table 1 Allowed Backhaul Subframe Configuration for TDD Configuration #3

| TDD UL-DL Configuration | Un DL:UL ratio | Un subframe configuration index | Subframe n | | | | | | | | | |
|---|---|---|---|---|---|---|---|---|---|---|---|---|
| | | | 0 | 1 | 2 | 3 | 4 | 5 | 6 | 7 | 8 | 9 |
| | | | D | S | U | U | U | D | D | D | D | D |
| 3 | 1:1 | 0 | | | | √ | | | | √ | | |
| | 2:1 | 1 | | | | √ | | | | √ | | √ |
| | 3:1 | 2 | | | | √ | | | | √ | √ | √ |
| | 3:2 | 3 | | | √ | √ | | | | √ | √ | √ |

FIG. 16

H-ARQ TIMING AND BACKHAUL SUBFRAME CONFIGURATION FOR TDD RELAY IN LTE-A

CROSS-REFERENCE TO RELATED APPLICATION(S)

This application claims the benefit of U.S. Provisional Application Ser. No. 61/374,891, entitled "Transmit-Response Timing for Relay Operation in Wireless Communications," filed on Aug. 18, 2010, which is expressly incorporated by reference herein in its entirety.

BACKGROUND

1. Field

The present disclosure relates generally to communication systems, and more particularly, to H-ARQ timing for TDD relays.

2. Background

Wireless communication systems are widely used to provide a variety of communication services such as voice, data, broadcast, and others. These communication systems may be multiple-access systems supporting simultaneous resource use by multiple users. This resource sharing is accomplished through the use of shared system resources, including bandwidth and transmit power. A number of multiple access systems are currently in use and include code division multiple access (CDMA), time division multiple access (TDMA), frequency division multiple access (FDMA), and orthogonal frequency division multiple access (OFDMA). These access systems may be used in conjunction with various communication standards such as those promulgated by 3GPP Long Term Evolution (3G LTE). LTE is an emerging telecommunication standard and is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

Wireless multiple access communication systems typically support multiple wireless terminals. Each wireless terminal, also known as a mobile device or user equipment (UE), communicates with one or more base stations using forward and reverse links. The forward link refers to communication link from the base stations to the mobile terminals or UEs, and may also be known as the downlink. The reverse link refers to the communication link from the UEs to the base stations (BS). The communication link may be established by a single link system or a multiple input, multiple output (MIMO) system.

The traffic generated by the UEs and BSs is managed in part by a serving network controller, which serves as the arbiter of wireless traffic. The network controller can send control information to UEs, assign wireless resources to UEs, manages uplink and downlink interference, and coordinates MIMO transmissions among neighboring BSs. The serving network controller acts as a central planner for managing the disparate wireless communications and ensures consistency and reliability.

As wireless networks and usage expand, network management becomes more complex. Networks must support both the latest generation of wireless devices from the moment of introduction, while maintaining support for older legacy equipment. Backward compatibility adds much design complexity to network planning and deployment. Changes to network standards have the potential to render millions of mobile phones, tablets, and computer accessories obsolete overnight. Backward compatibility ensures that the older legacy devices may be used with new standards that provide support for new devices and features.

Merely porting older standards into newer systems can lead to convoluted and inefficient system architectures, with rules applying based on equipment type and model. Such inefficiencies should be avoided by careful planning of the radio access network infrastructure (base stations, relay stations, repeater stations, and mobile switching controllers), core network infrastructure (location registers, billing and charging servers, subscription servers, and customer support infrastructure), and user equipment (mobile phones, personal digital assistants, and smart phones). Wireless communication standards groups such as 3GPP and 3GPP2 are charged with keeping backward compatibility in mind when new standards are adopted.

An example of backward compatibility issues involves the use of hybrid automatic repeat request (H-ARQ) when used in conjunction with a time division duplex (TDD) relay. There is a need in the art for a backward compatible downlink (DL) H-ARQ process and a backward compatible uplink (UL) H-ARQ process in the access link.

SUMMARY

In an aspect of the disclosure, a method for wireless communication at a half-duplex node operating in TDD mode is provided. The method comprises the steps of receiving a configuration of a first set of subframes for a first link communication. This first set of subframes contains at least one downlink subframe and at least one uplink subframe. The next step determines a second set of subframes for a second link communication. This second set includes at least one backward compatible downlink hybrid automatic repeat request process and at least one backward compatible uplink hybrid automatic repeat request process that requires a second set of subframes. Once the first and second set of subframes have been determined, communication begins with a first set of nodes using the first link and the first set of subframes. Communication also begins with a second set of nodes using the second link and the second set of subframes. In using the second set of subframes, communication to a legacy node uses the at least one backward compatible downlink hybrid automatic repeat request process and the at least one backward compatible uplink hybrid automatic repeat request process.

A further embodiment of the present invention provides for the half-duplex node to be a relay node. In these situations, the first link is a backhaul link and the second link is an access link.

An additional embodiment provides that the first set of nodes may comprise one node and the one node is a donor enhanced Node B.

Yet a further embodiment provides that the backward compatible hybrid automatic repeat request process satisfies the downlink and uplink timing requirements of the LTE Release 8 specification, when operating in TDD mode.

Additional embodiments may provide for relationships between the sets of subframes. As one example, the second set of subframes may be complementary to the first set of subframes and the union of the two sets comprising all of the subframes. In addition, at least one node in the second set of nodes may be informed of a third set of subframes that are to be used for communication over the second link. The second link communication may also be accomplished by employing at least one non-backward compatible hybrid automatic repeat request proves for at least one node. This hybrid automatic repeat request process is based on the third set of subframes for the second link communication. Furthermore, the third set of subframes may be a subset of the second set of subframes, or the third set of subframes may be identical to the second set of subframes. The third set of subframes may also be a subset of the second set of subframes or may be identical to the second set of subframes.

An additional embodiment provides acknowledgment or negative acknowledgment (ACK/NAK) feedback. The ACK/NAK feedback is provided in an uplink subframe in response to a downlink transmission that discounts subframes not contained in the third set of subframes.

A further embodiment provides for specific ratios between the downlink and uplink subframes. One embodiment provides that the ratio of downlink subframes to uplink subframes be no greater than 4. In another embodiment, the ratio of downlink subframes to uplink subframes is no less than 1. A still further alternate embodiment provides that the ratio of the downlink subframes to the uplink subframes in the second set not be greater than 4.

An additional embodiment provides that the subframes in the first set comprise multicast broadcast single frequency network (MBSFN) frames at the half-duplex node.

An additional embodiment provides a method for wireless communication at an enhanced Node B operating in TDD mode to a half-duplex node. The method includes the steps of generating a configuration of a first set of subframes for a first link communication, wherein the first set of subframes contains at least one downlink subframe and at least one uplink subframe. The method then proceeds to determine a second set of subframes for a second link communication. In this second set of subframes there is at least one backward compatible downlink hybrid automatic repeat request process and at least one backward compatible uplink hybrid automatic repeat request process requiring the second set of subframes. Once the first and second sets of subframes have been determined communication occurs with the half-duplex node using the first link and the first set of subframes. Communication with a second set of nodes also occurs and this communication uses the second link and the second set of subframes.

A still further embodiment provides an apparatus for wireless communication at a half-duplex node operating in TDD mode to a half-duplex node. The apparatus includes a transmitter for transmitting a configuration of a first set of subframes for a first link communication, wherein the first set of subframes contains at least one downlink subframe and at least one uplink subframe. A memory is provided for storing the configuration of the first set of subframes. A processor is used for determining a second set of subframes for a second link communication, wherein there is at least one backward compatible hybrid automatic repeat request process and at least one backward compatible uplink hybrid automatic repeat request process requiring the second set of subframes. The apparatus also includes a transmitter for communicating with a half-duplex node using the first link and the first set of subframes.

An additional embodiment provides an apparatus for wireless communication at an enhanced Node B operating in TDD mode. The apparatus includes a receiver for receiving a configuration of a first set of subframes for a first link communication, wherein the first set of subframes contains at least one downlink subframe and at least one uplink subframe. A memory for storing the configuration of the first set of subframes is also provided. A process is incorporated and is used for determining a second set of subframes for a second link communication, wherein there is at least one backward compatible downlink hybrid automatic repeat request process and at least one backward compatible uplink hybrid automatic repeat request process requiring the second set of subframes. The apparatus also includes a transmitter for communicating with a first set of nodes using the first link and the first set of subframes. The transmitter also communicates with a second set of nodes using the second link and the second set of subframes, wherein the communication to a legacy node uses the at least one backward compatible downlink hybrid automatic repeat request process and the at least one backward compatible uplink hybrid automatic repeat request process.

A further embodiment provides an apparatus for wireless communication at a half-duplex node operating in TDD mode. This embodiment comprises: means for receiving a configuration of a first set of subframes that contains at least one downlink subframe and at least one uplink subframe; means for determining a second set of subframes for a second link communication, wherein there is at least one backward compatible downlink hybrid automatic repeat request process and at least one backward compatible uplink hybrid automatic repeat request process requiring the second set of subframes; means for communicating with a first set of nodes using the first link and the first set of subframes; and means for communicating with a second set of nodes using the second link and the second set of subframes, wherein the communication to a legacy node uses the at least one backward compatible downlink hybrid automatic repeat request process and the at least one backward compatible uplink hybrid automatic repeat request process.

Yet a further embodiment provides a non-transitory computer-readable medium comprising instructions for wireless communication at a half-duplex node operating in TDD mode, which when executed by a processor causes the processor to: receive a configuration of a first set of subframes for a first link communication, wherein the first set of subframes contains at least one downlink subframe and at least one uplink subframe. The processor also determines a second set of subframes for a second link communication, wherein there is at least one backward compatible uplink hybrid automatic repeat request process requiring the second set of subframes. The processor communicates with a first set of nodes using the first link and the first set of subframes and communicates with a second set of nodes using the second link and the second set of subframes, wherein the communication to a legacy node uses the at least one backward compatible downlink hybrid automatic repeat request process and the at least one backward compatible uplink hybrid automatic repeat request process.

BRIEF DESCRIPTION OF THE DRAWINGS

FIG. 16 shows the allowed backhaul subframe configuration for a TDD configuration.

DETAILED DESCRIPTION

Figure 1:
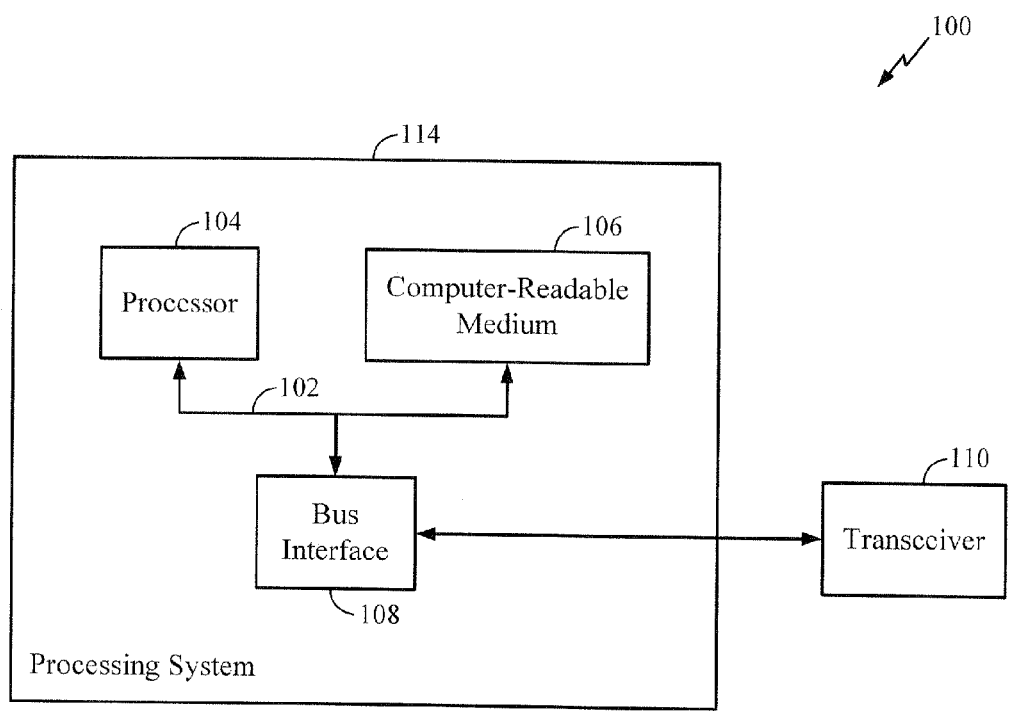
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
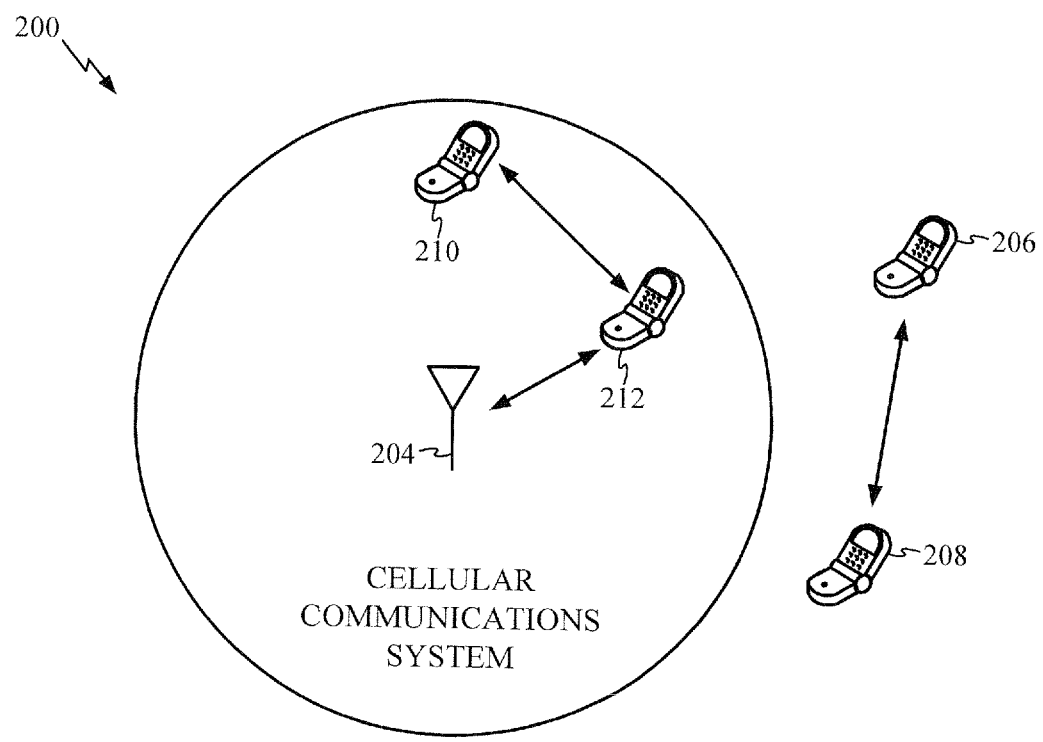
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDM) networks, Single Carrier FDMA (SC-FDMA) networks, among others. A CDMA network can implement a radio technology such as Universal Terrestrial Radio Access (UTRA), CDMA2000, and other technologies. UTRA includes Wideband CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, and others. UTRA, E-UTRA, and GSM are part of the Universal Mobile Telecommunication System (UMTS). Long Term Evolution (LTE) is a release of UMTS that uses E-UTRA. UTRA, E-UTRA, GSM, UMTS, and LTE are described in specifications issued by the "3$^{rd}$ Generation Partnership Project" (3GPP). CDMA2000 is described in the specification promulgated by the "3$^{rd}$ Generation Partnership Project 2" (3GPP2). However, one of ordinary skill in the art would understand that the exemplary methods and apparatuses are applicable more generally to a variety of other wireless peer-to-peer communication systems.

Figure 3:
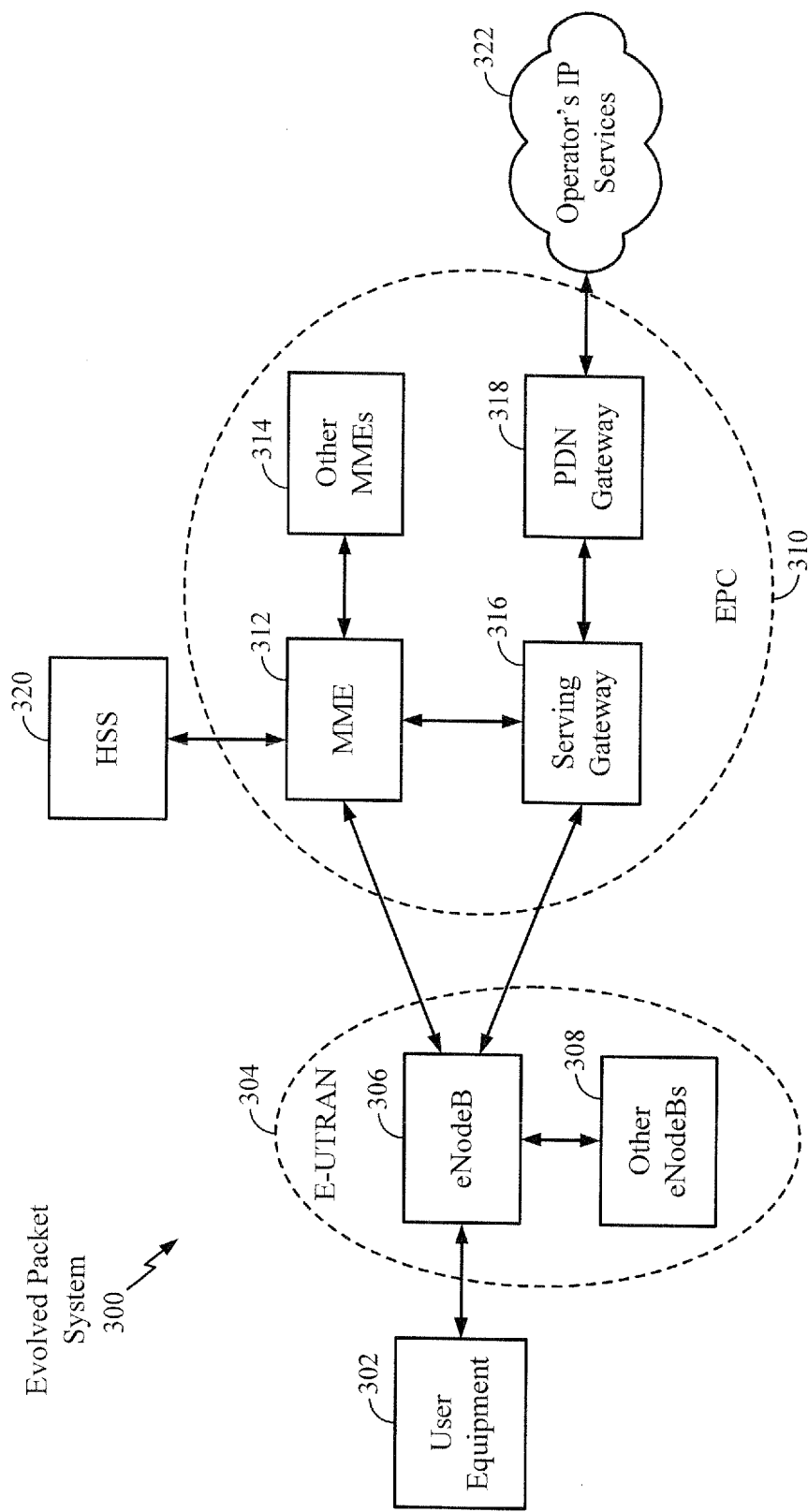
FIG. 3 is a diagram illustrating an example of a network architecture.

FIG. 3 is a diagram illustrating an LTE network architecture 300 employing various apparatuses 100 (See FIG. 1). The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 306 and other eNBs 308. The eNB 306 provides user and control plane protocol terminations toward the UE 302. The eNB 306 may be connected to the other eNBs 308 via an X2 interface (i.e., backhaul). The eNB 306 may also be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of UEs 302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 306 is connected by an S1 interface to the EPC 310. The EPC 310 includes a Mobility Management Entity (MME) 212, other MMEs 314, a Serving Gateway 316, and a Packet Data Network (PDN) Gateway 318. The MME 312 is the control node that processes the signaling between the UE 302 and the EPC 310. Generally, the MME 312 provides bearer and connection management. All user IP packets are transferred through the Serving Gateway 316, which itself is connected to the PDN Gateway 318. The PDN Gateway 318 provides UE IP address allocation as well as other functions. The PDN Gateway 318 is connected to the Operator's IP Services 322. The Operator's IP Services 322 include the Internet, the Intranet, an IP Multimedia Subsystem (IMS), and a PS Streaming Service (PSS).

Figure 4:
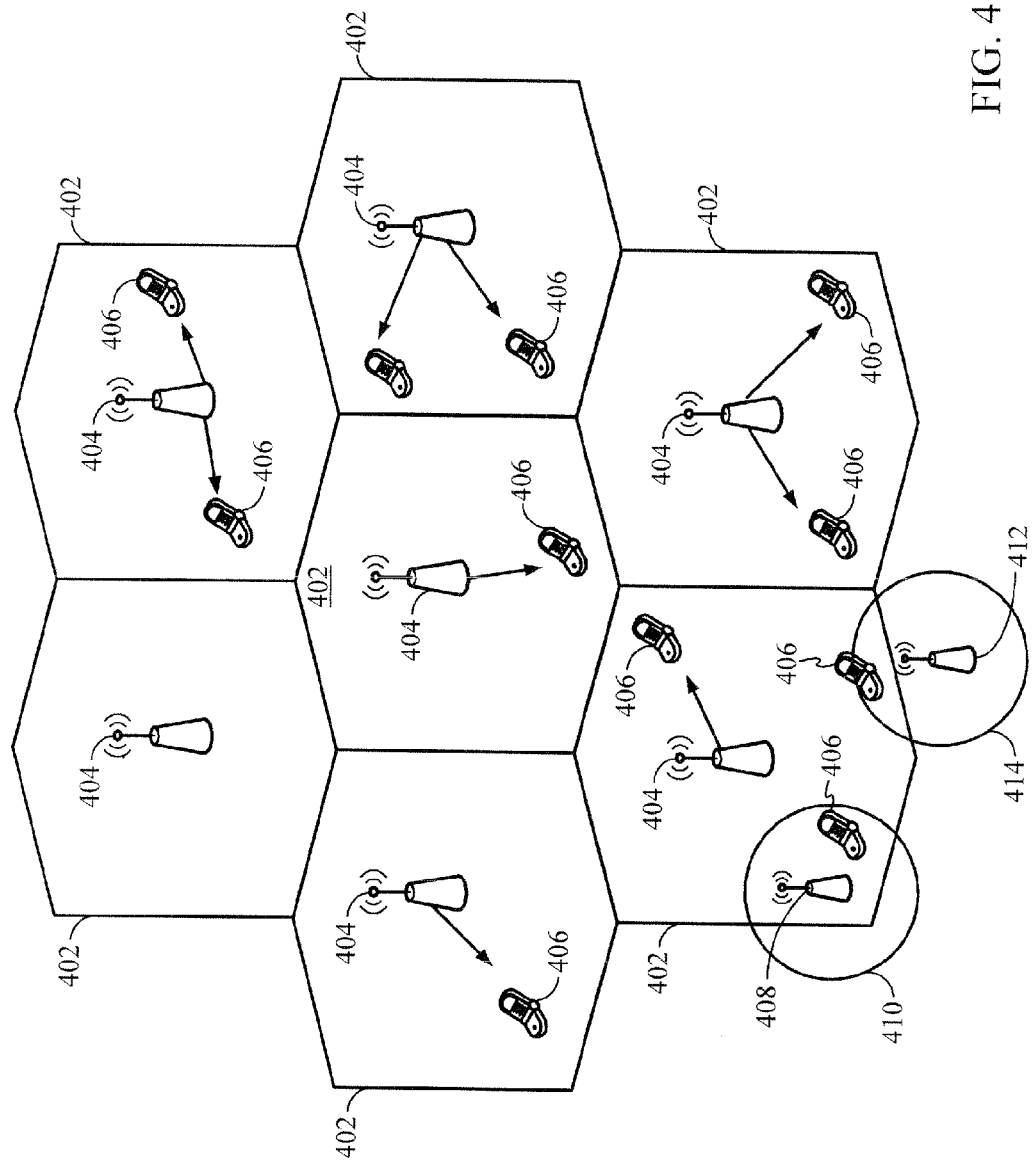
FIG. 4 is a diagram illustrating an example of an access network.

FIG. 4 is a diagram illustrating an example of an access network in an LTE network architecture. In this example, the access network 400 is divided into a number of cellular regions (cells) 402. One or more lower power class eNBs 408, 412 may have cellular regions 410, 414, respectively, that overlap with one or more of the cells 402. The lower power class eNBs 408, 412 may be femto cells (e.g., home eNBs (HeNBs)), pico cells, or micro cells. A higher power class or macro eNB 404 is assigned to a cell 402 and is configured to provide an access point to the EPC 310 for all the UEs 406 in the cell 402. There is no centralized controller in this example of an access network 400, but a centralized controller may be used in alternative configurations. The eNB 404 is responsible for all radio related functions including radio bearer control, admission control, mobility control, scheduling, security, and connectivity to the serving gateway 316 (see FIG. 3).

The modulation and multiple access scheme employed by the access network 400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 404 may have multiple antennas supporting MIMO technology. The use of MIMO technology enables the eNB 404 to exploit the spatial domain to support spatial multiplexing, beamforming, and transmit diversity.

Spatial multiplexing may be used to transmit different streams of data simultaneously on the same frequency. The data steams may be transmitted to a single UE 406 to increase the data rate or to multiple UEs 406 to increase the overall system capacity. This is achieved by spatially precoding each data stream and then transmitting each spatially precoded stream through a different transmit antenna on the downlink. The spatially precoded data streams arrive at the UE(s) 406 with different spatial signatures, which enables each of the UE(s) 406 to recover the one or more data streams destined for that UE 406. On the uplink, each UE 406 transmits a spatially precoded data stream, which enables the eNB 404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 5:
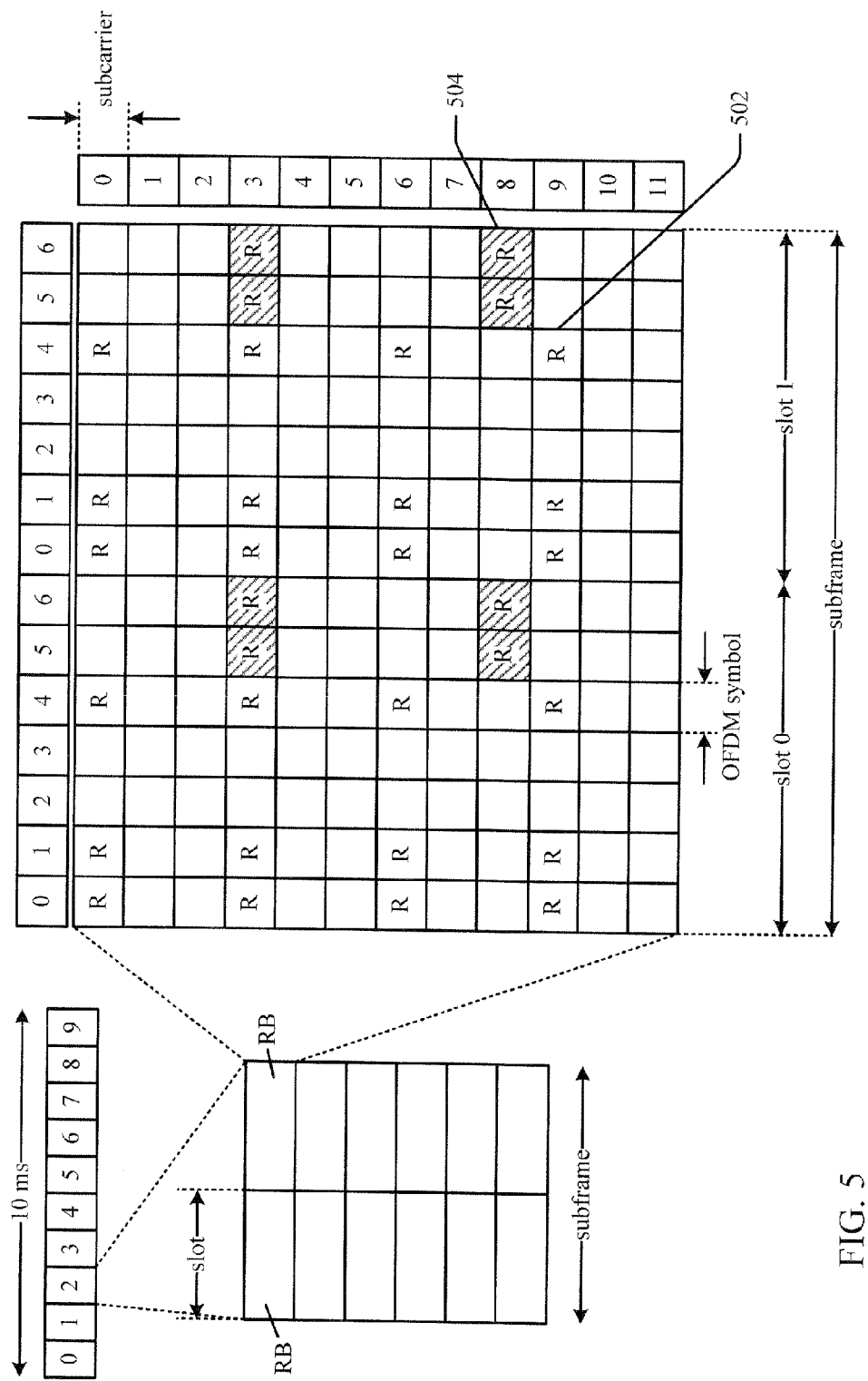
FIG. 5 is a diagram illustrating an example of a frame structure for use in an access network.

Various frame structures may be used to support the DL and UL transmissions. An example of a DL frame structure will now be presented with reference to FIG. 5. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 502, 504, include DL reference signals (DL-RS). The DL-RS include Cell-specific RS (CRS) (also sometimes called common RS) 502 and UE-specific RS (UE-RS) 504.

UE-RS 504 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 6:
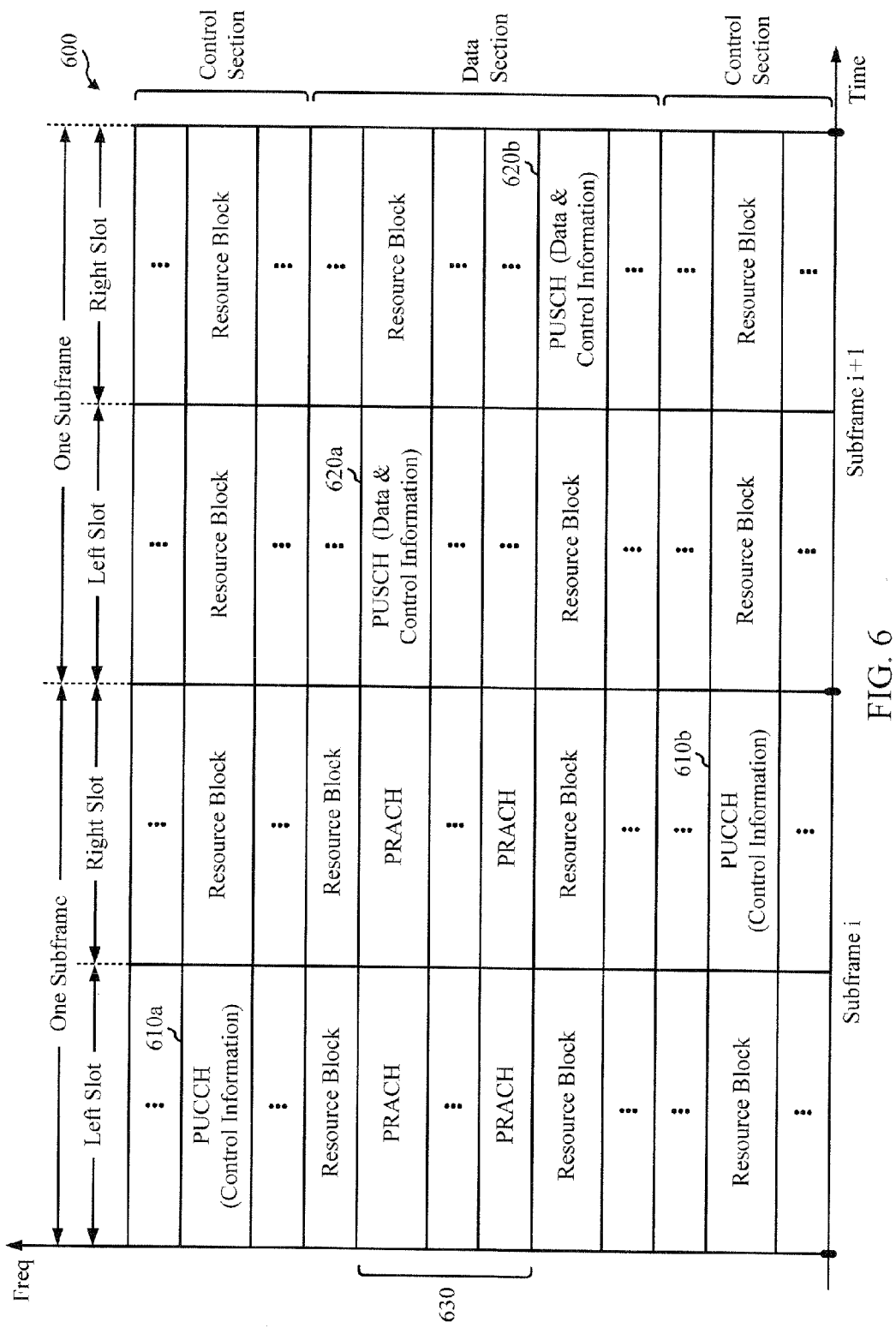
FIG. 6 shows an exemplary format for the UL in LTE.

An example of a UL frame structure 600 will now be presented with reference to FIG. 6. FIG. 6 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 6 results in the data section including contiguous subcarriers, which may allow a single UE to be assigned all of the contiguous subcarriers in the data section.

A UE may be assigned resource blocks 610a, 610b in the control section to transmit control information to an eNB. The UE may also be assigned resource blocks 620a, 620b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 6.

As shown in FIG. 6, a set of resource blocks may be used to perform initial system access and achieve UL synchronization in a physical random access channel (PRACH) 630. The PRACH 630 carries a random sequence and cannot carry any UL signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 7:
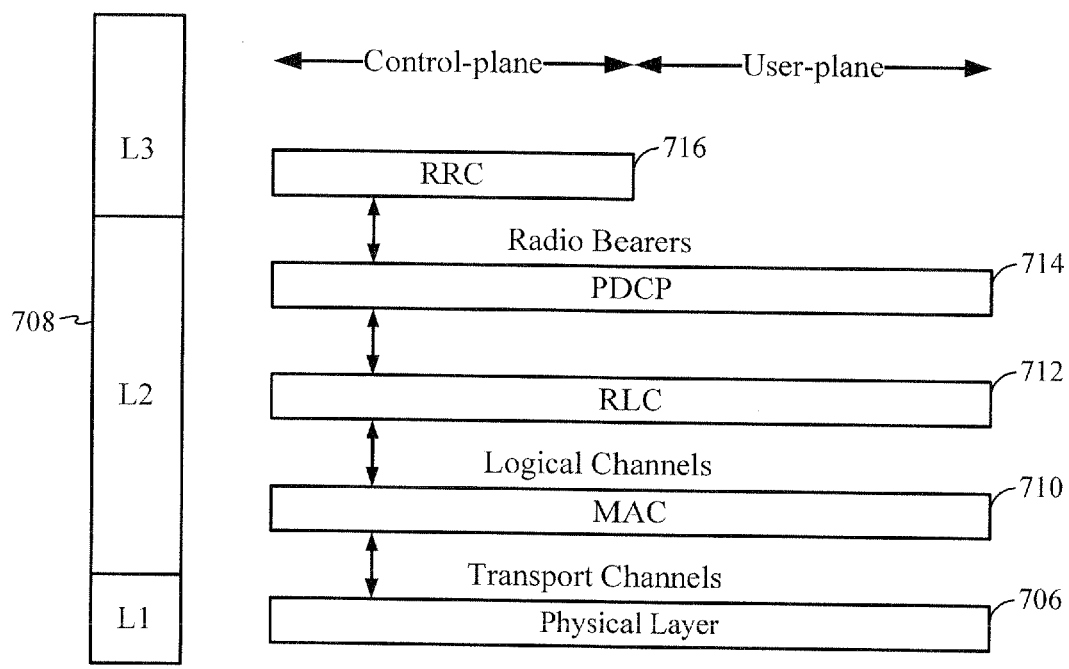
FIG. 7 is a diagram for illustrating an example of a radio protocol architecture for the user and control plane.

The radio protocol architecture may take on various forms depending on the particular application. An example for an LTE system will now be presented with respect to FIG. 7. FIG. 7 is a conceptual diagram illustrating an example of the radio protocol architecture for the user and control planes.

Turning to FIG. 7, the radio protocol architecture to the UE and the eNB is shown with three layers: Layer 1, Layer 2, and Layer 3. Layer 1 is the lowest layer and implements various physical layer signal processing functions. Layer 1 will be referred to herein as the physical layer 706. Layer 2 (L2 layer) 708 is above the physical layer 706 and is responsible for the link between the UE and eNB over the physical layer 706.

In the user plane, the L2 layer includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g. IP layer) that is terminated at the PDN gateway 308, (see FIG.

3) on the network side, and an application layer that is terminated at the other end of the connection (e.g., far end UE, server, etc.).

The PDCP layer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
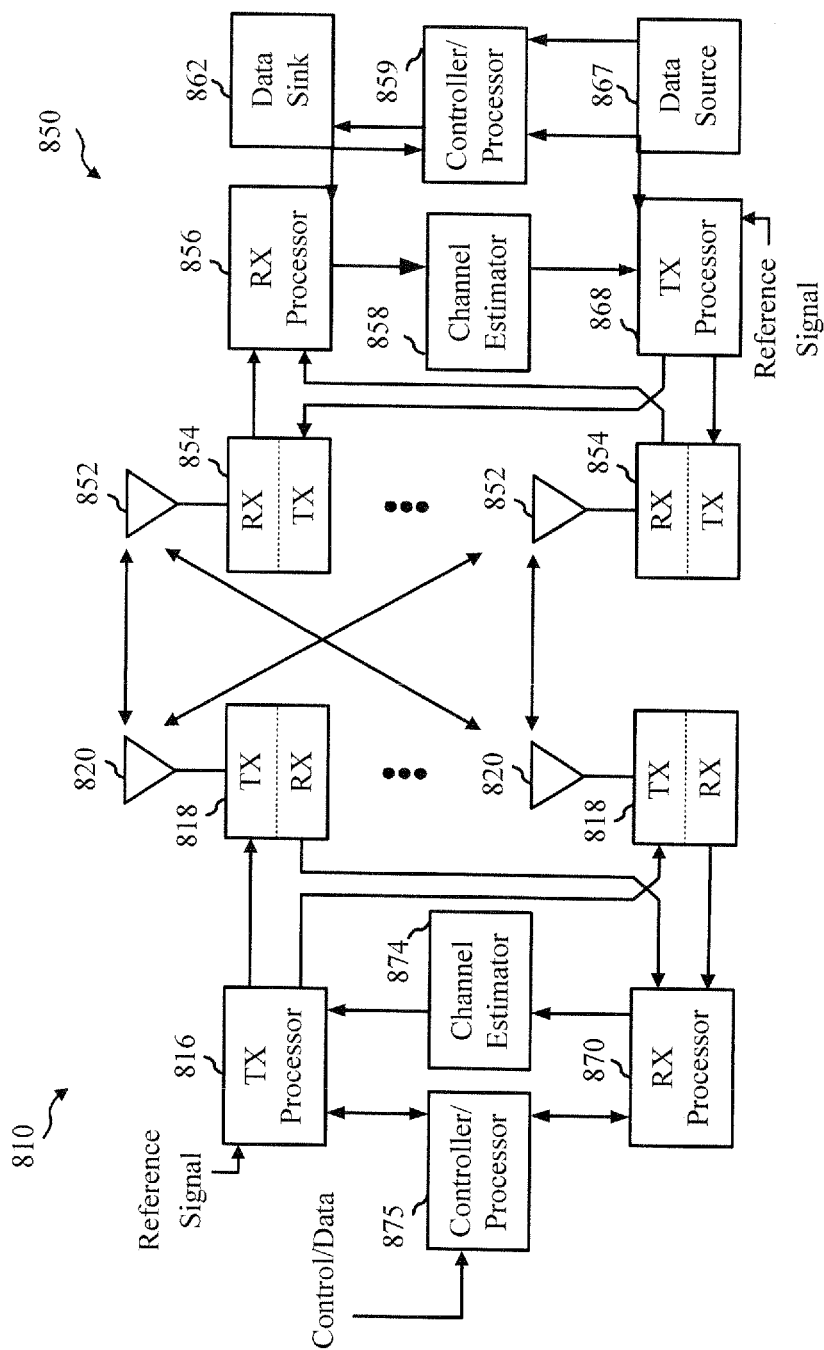
FIG. 8 is a diagram illustrating an example of an evolved Node B and user equipment in an access network.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE. FIG. 8 is a block diagram of an eNB 810 in communication with a UE 850 in an access network. In the DL, upper layer packets from the core network are provided to a controller/processor 875. The controller/processor 875 implements the functionality of the L2 layer described earlier in connection with FIG. 7. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The TX process 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 818TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receiver (RX) processor 856.

The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal has a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer (L2). Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 implements the L1 layer.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the UE 850. Upper layer packets from the controller/processor 875 may be provided to the core network. The controller/processor 859 is also responsible for error detection using an ACK and/or NACK protocol to support HARQ operations.

The processing system 104 described in relation to FIG. 1 includes the eNB 810. In particular, the processing system 104 includes the TX processor 816, the RX processor 870, and the controller 875.

Figure 9:
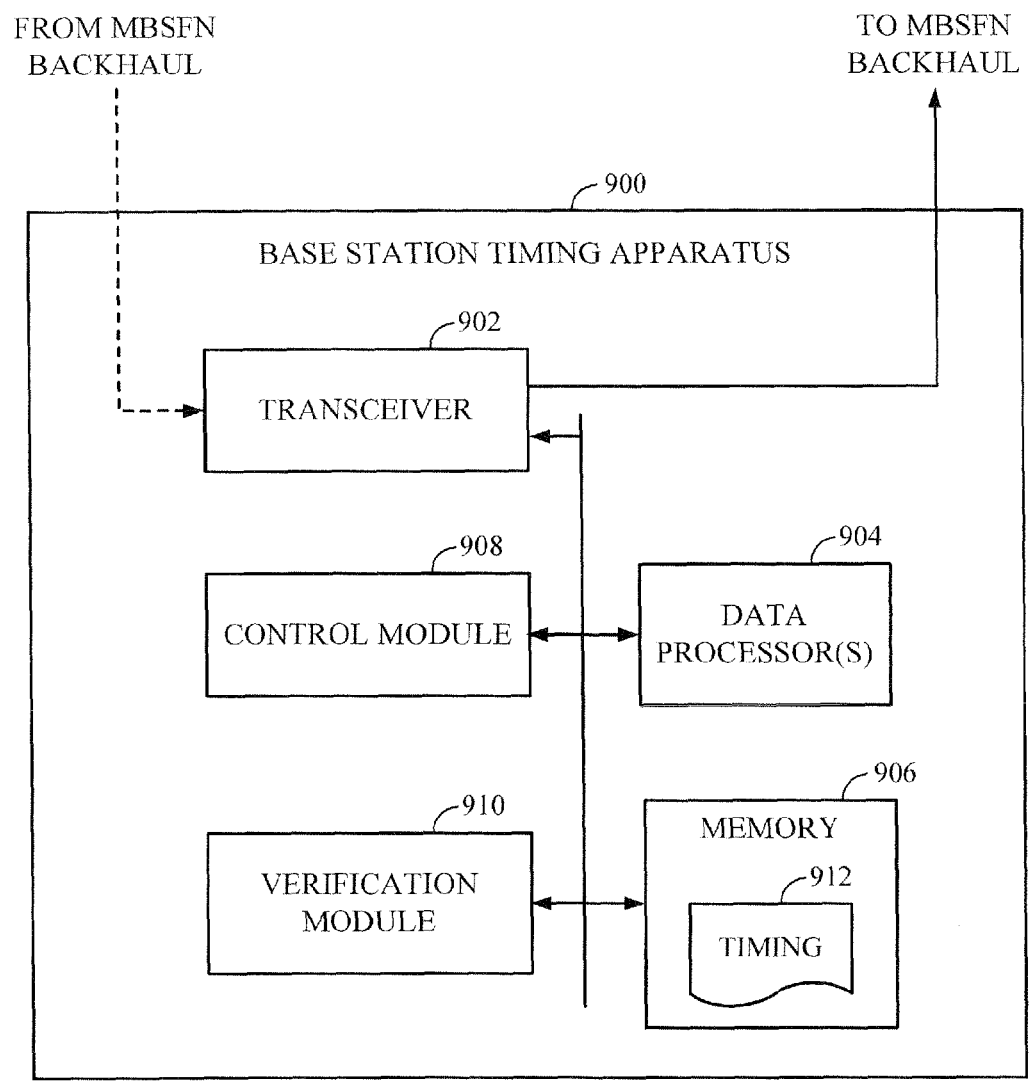
FIG. 9 is a block diagram of a base station timing apparatus.

FIG. 9 is a block diagram of an example base station timing apparatus 1200 that provides timing configuration for wireless network communications that employ a relay node. The timing configuration may include a backhaul timing configuration for wireless communication between the network base station and the relay node. The backhaul timing configuration may include the subframes for backhaul communication and may include hybrid automatic repeat request (H-ARQ) communication and acknowledgment (ACK) and negative acknowledgment (NAK) transmissions between the network base station and the relay node.

The base station timing apparatus 900 can be coupled with a base station of a wireless network. When coupled, the base station timing apparatus 900 allows the base station to implement timing configuration 912 stored in memory 906 of base station timing apparatus 900. The timing configuration 912 may then be implemented by the base station to provide control signaling for the backhaul link with a relay node as well as for an access link between the relay node and the access terminal or user equipment. Control signaling for the backhaul link may be on subframes of a particular type. As one example, multimedia broadcast single frequency network (MBSFN) subframes can be used for the backhaul link. When MBSFN subframes are used, the relay node may be either a half-duplex transmitter or a full duplex transmitter.

One embodiment provides for base station timing apparatus 900 may comprise a wireless communication interface. The interface may include a wireless transceiver or an electronic communication interface with the wireless transceiver. This interface transmits and receives wireless signals over the backhaul network with the relay node. The base station timing apparatus 900 may also comprise a memory 906. Memory 906 may store a set of modules configured to implement timing configuration 912. Data processor 904 executes the set of modules stored in memory 906. Base station timing apparatus 900 may comprise a control module 908 that generates a control message according to the timing configuration 912 specifications and then uses communication interface 902 to send the control message to the relay node. Base station timing apparatus may also include a verification module 910 that utilizes communication interface 902 to obtain responses to the control message sent by the relay node. Verification module 910 verifies the consistency of the response and the timing configuration 912. Timing configuration 912 may also provide transmit-response timing for the backhaul network and a wireless access link between the relay node and the access terminal or user equipment. In an alternate embodiment, timing configuration 912 may also provide timing configuration that supports at least two legacy timing configurations.

As one example, timing configuration 912 may comprise backhaul and access link subframe periodicity for downlink transmission. 8 millisecond (ms), 10 ms, or a combination, systems may be supported by timing configuration 912. Timing configuration 912 may be based on a 40 ms system, or other system incorporating 8 ms and 10 ms systems, such as 80 ms. For uplink transmission, timing configuration 912 may provide 8 ms H-ARQ timing for the backhaul network. As an alternative embodiment, uplink transmission may depend on the downlink periodicity. In this case, the downlink may use 40 ms periodicity, the uplink may use 8 ms. Alternatively, the downlink may use 10 ms periodicity and the uplink may also use 10 ms periodicity.

The backhaul timing configuration may employ ad-hoc timing for transmit-response transmissions. An H-ARQ transmission or repeat request communication may be based on the availability of a subframe assigned to the backhaul network, instead of a predetermined number of general subframes. The backhaul timing configuration may be explicitly indicated by layer 3 or layer 2 (semi-static) signaling. In an alternative embodiment, the backhaul timing configuration may be specified according to a deterministic rule that defines timing relationships between the downlink channels and the uplink responses. Timing configurations may provide a subframe relationship for a next available (or number of next available) dedicated backhaul subframes between relay physical downlink shared channel (R-PDSCH) messages and uplink ACK/NAK messages, and relay physical downlink control channel (R-PDCCH) or relay physical H-ARQ indicator channel (R-PHICH) messages and relay physical uplink shared channel (R-PUSCH) messages, or R-PUSCH messages and R-PDCCH or relay physical H-ARQ indicator channel (R-PHICH) messages, or a combination of the above messages.

The access link timing configuration may comprise asymmetric mapping between downlink and uplink subframes. In such cases, at least one downlink access link subframe is mapped with at least one uplink subframe. In addition, multiple downlink access link subframes can be mapped to a single uplink access link subframe. In one alternative, messages in a single downlink access link subframe can be mapped for ACK/NAK messaging in multiple uplink access link subframes. As an example, PHICH messages may be bundled with ACK/NAK subframes.

Mapping a single downlink subframe to multiple uplink subframes may be implemented by coupling multiple uplink PUSCH messages with the PHICH or PDCCH messages concurrently in a common downlink subframe. Furthermore, TDD type uplink ACK/NAK bundling may be provided for the backhaul network. In one embodiment, one PDCCH can be scheduled to occur over two or more PUSCH transmission (such as with a common resource allocation, modulation and coding scheme). In another embodiment, up to two PUSCHs can be configured and limited to the first two uplink subframes. In addition, PHICH may be used to suspend one or more uplink transmissions, which may be desirable is an expected response is not received at verification module 910 in a specified subframe.

A single downlink subframe may be mapped to multiple uplink subframes. The number of downlink subframes mapped is greater than one. One PDCCH may be used to address all of the uplink subframes. In an alternative embodiment, multiple PDCCHs addressing the multiple uplink subframes may be provided where each PDCCH schedules one uplink subframe. In still another embodiment, multiple PDCCHs may be assigned to address multiple uplink subframes. In this case, the number of multiple uplink and downlink frames is greater than one and the number of downlink frames is different from the number of uplink frames.

In another embodiment, TDD can be provided for one configuration, where one downlink subframe schedules multiple uplink subframes. In this case, the multiple subframes to be mapped may be contiguous or non-contiguous. As an example, for downlink mapping using multiple subframes, where M=number of downlink subframes mapped, and K=number of uplink frames mapped, where M=4 and K=2 a {downlink, uplink} mapping can be {1,2} and {3,4} or {1,3} and {2,4} or another suitable combination of downlink and uplink subframes. The PHICH may also use a similar mapping. In an embodiment, one PHICH may address all uplink subframes. In another embodiment, TDD type uplink ACK/NAK bundling may be used to bundle the multiple subframes. In yet another embodiment, multiple PHICHs may be used to address multiple uplink subframes, where each PHICH handles multiple uplink subframes. Within each uplink subframe, TDD type bundling may be applied.

In a still further embodiment, R-PHICH may be replaced by R-PDCCH. While some overhead efficiency is sacrificed, the resulting timing configuration may be mapped more efficiently to the dedicated backhaul subframes, such as MBSFN subframes. In the case of synchronized H-ARQ operation on the uplink on the backhaul network, if the relay node misses a R-PDCCH message, the relay node may suspend a R-PUSCH transmission and repeat a previous transmission until a suitable R-PDCCH message is received in acknowledgment of the repeated transmission. The relay node may then proceed with the R-PUSCH transmission.

Figure 10:
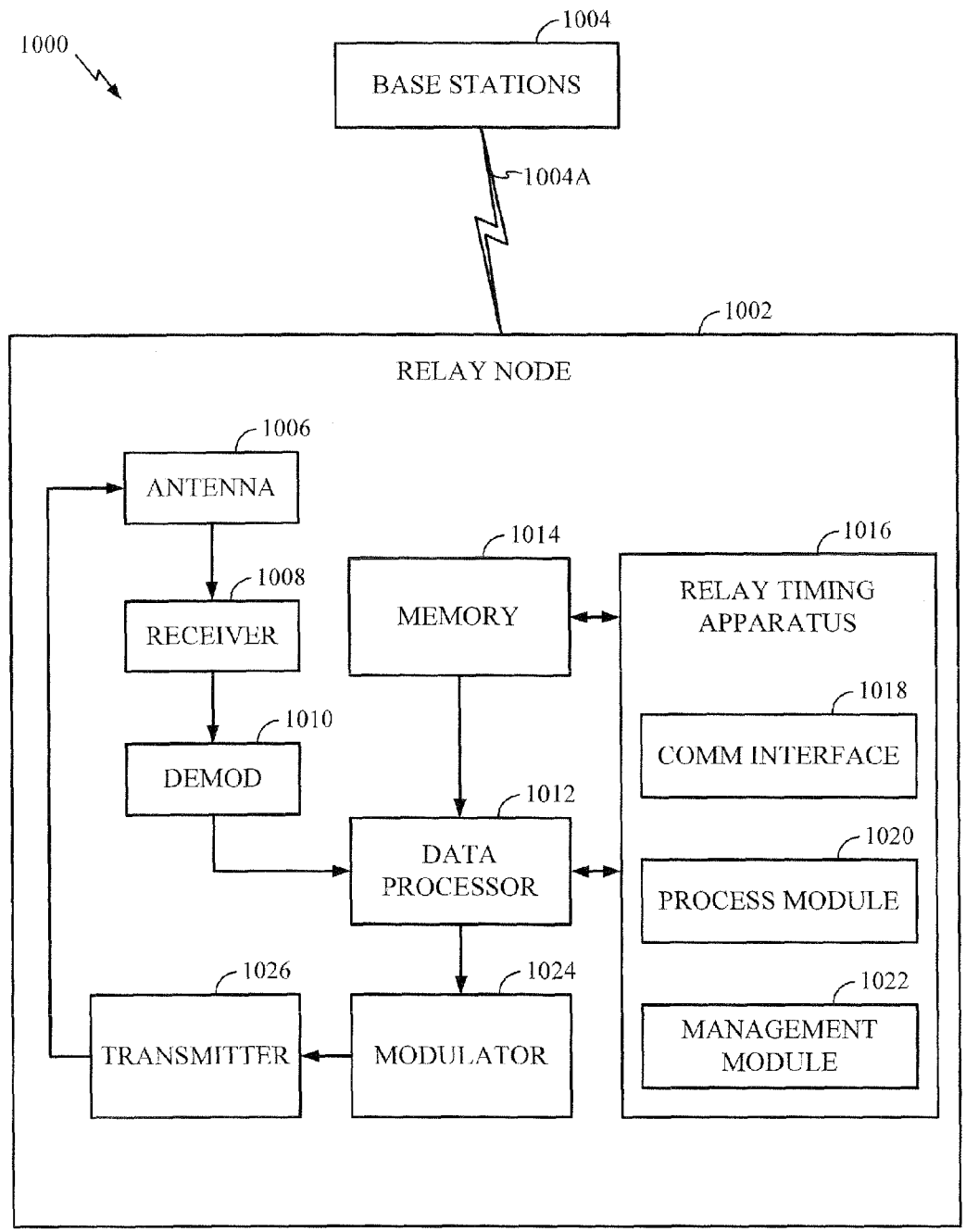
FIG. 10 is a block diagram of a relay node and a base station in a backhaul network.

FIG. 10 illustrates a block diagram of an exemplary system comprising a relay node 1002 communicatively coupled with a base station 1004 over a backhaul network 1004A. Backhaul network 1004A may be configured on non-control subframes, such as MBSFN subframes. Base station 1004 transmits on the downlink subframes of the backhaul network 1004A, while relay node 1002 responds on the uplink subframes of the backhaul network 1304A. The timing configuration and periodicity of the downlink transmission and uplink responses are governed by the backhaul timing configuration described below.

Relay node 1002 includes at least one antenna 1006 that receives a signal and receiver(s) 1008, which act on the received signal. In general, antenna 1006 and a transmitter 1026 (or transceiver) may be configured to exchange wireless data with base station 1004. Receiver 1008, demodulator 1010, modulator 1024 and transmitter 1026 may use either full-duplex or half-duplex transmission and reception for the backhaul network, as well as the access link network between relay node 1002 and an access terminal or user equipment.

Antenna 1006 and receiver 1008 may be coupled with demodulator 1010 to demodulate received symbols and provide signals to data processor 1012 for evaluation. Data processor 1012 may control or reference multiple components of access terminal 1002, including antenna 1006, receiver 1008, demodulator 1010, memory 1014, and the relay timing apparatus, 1016. Data processor 1012 may execute in one or more modules or applications that comprise control or functional information relevant to executing the functions of relay node 1002.

Memory 1014 of relay node 1002 is coupled to data processor 1012. Memory 1014 stores data to be transmitted, received, and instructions for conducting wireless operations with remote device 1004. Memory 1014 may also store modules, applications, engines associated with the relay timing apparatus 1016. These instructions are executed by processor 1012.

Relay node 1002 further comprises a relay timing apparatus 1016 for managing uplink response transmission timing for the relay node consistent with the backhaul timing configuration established by base station 1004. The relay timing apparatus may comprise a half-duplex communication interface 1018 for sending and receiving data on the backhaul network or for transmitting and receiving data on the wireless access link. Timing apparatus 1016 may also comprise memory 1014 for storing modules used to implement a consistent timing configuration for the backhaul network or the access link network. A data processor 1012 may also be included in memory 1014. The modules incorporated may also include a processing module 1020 for obtaining control messages on a downlink over the backhaul network and a management module 1022 for transmitting or receiving data as specified by the timing configuration of the backhaul network or the access link. The timing configuration may comprise an ad-hoc timing rule for control response on the backhaul network.

Figure 11:
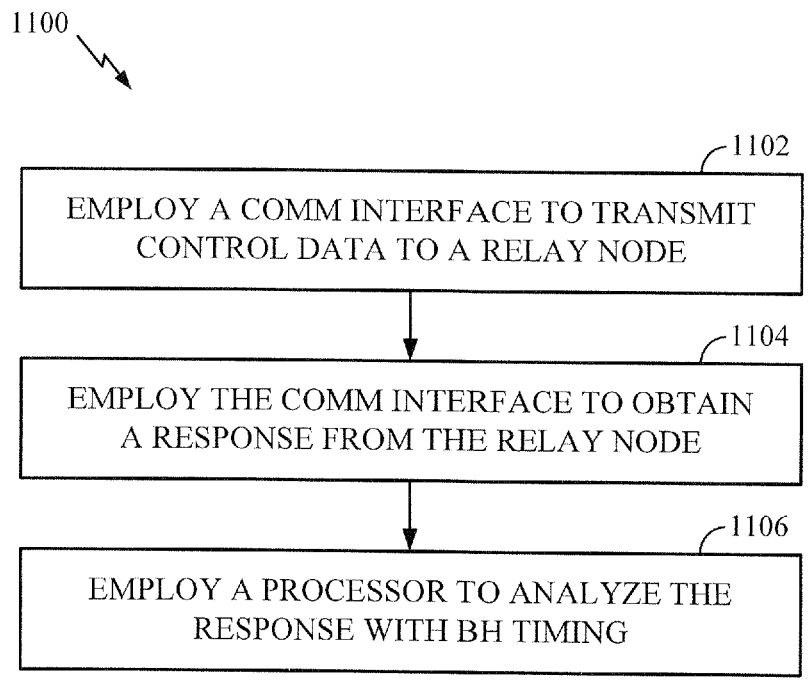
FIG. 11 is a flow chart of a method for providing a timing configuration in a wireless network.

FIG. 11 is a flow chart 1100 of an exemplary method. The method 1100 provides timing configuration in a wireless network. At step 1102, a communication interface is employed to transmit control data to a relay node over a wireless backhaul according to a backhaul timing configuration. At step 1104 a response to the control data from the relay node is received over the wireless backhaul in accordance with the backhaul timing configuration. A data processor may also be employed to analyze the response for conformity and consistency with the backhaul timing configuration. The specific backhaul timing configuration provides the selected backhaul response periodicity to accommodate various legacy timing configurations.

Figure 12:
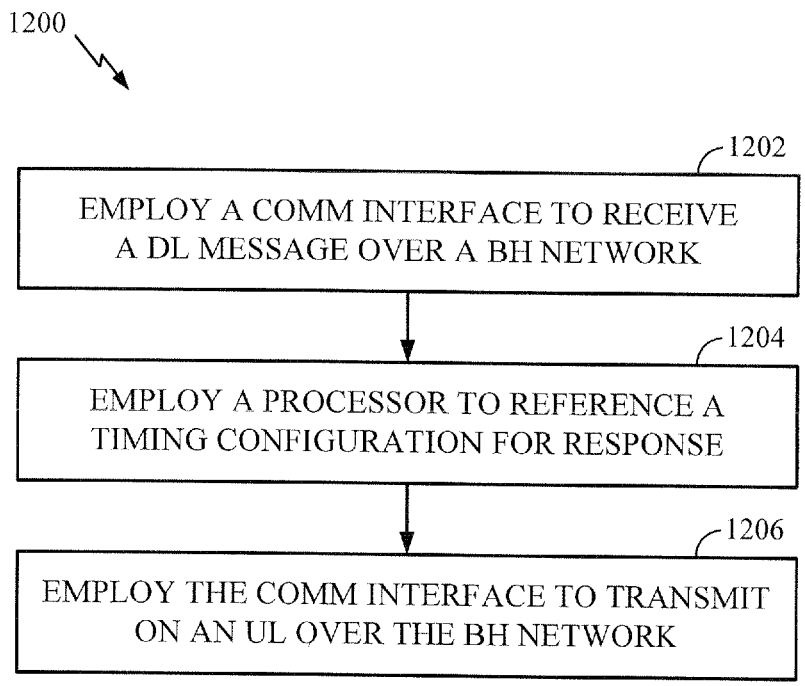
FIG. 12 is a flowchart of a methodology for providing a relay node in a wireless communication system.

FIG. 12 is a flowchart of a sample methodology 1200 for a relay node in a wireless communication system. At step 1202, a communication interface receives a downlink message over a backhaul network. The message comprises control data. At step 1204, a data processor references a control specification to determine the timing configuration specified for responding to the control data over the backhaul network. At step 1206, a response message is transmitted on an uplink over the backhaul network. In this method, the timing configuration supports both 10 ms and 8 ms wireless timing configurations.

Figure 13:
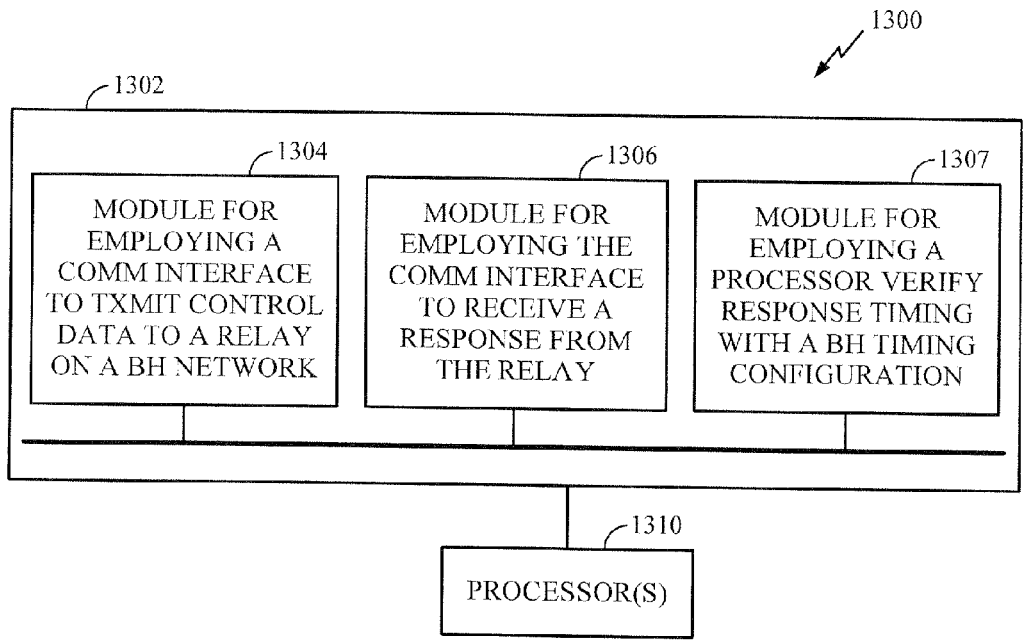
FIG. 13 is a block diagram of an embodiment for facilitating network triggered route optimized mobile communication.

FIG. 13 depicts a block diagram of an apparatus 1300 that facilitates network-triggered route optimized mobile communication according to embodiments of the present invention. Apparatus 1300 may reside partially within a wireless communication network or a transmitter, such as a node, base station, access point, user terminal, or personal computer.

Apparatus 1300 may comprise memory 1302 for storing one or more program modules configured to provide consistent timing configuration in a wireless network incorporating relay node communication. Apparatus 1300 may also comprise one or more data processors 1310 for executing the program modules. Apparatus 1300 may comprise module 1302 for transmitting control data to a relay node over a wireless backhaul using a specified backhaul timing configuration. Module 1306 is a data processor that analyzes the received response for consistency and conformity with the backhaul timing configuration.

Figure 14:
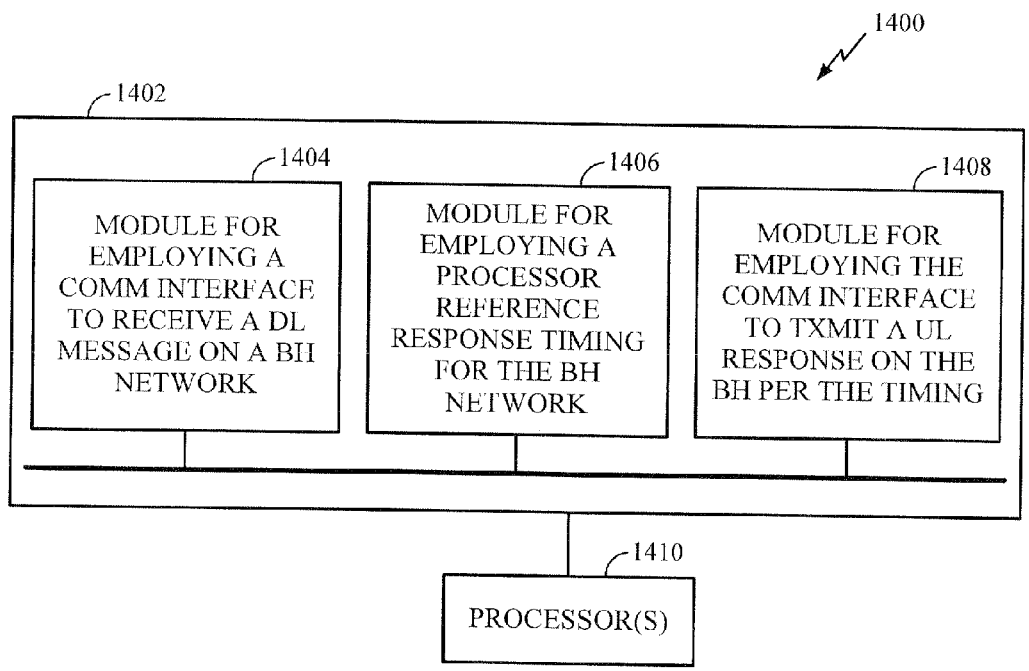
FIG. 14 is a block diagram of a further embodiment for facilitating network triggered route optimized mobile communication.

FIG. 14 depicts an apparatus 1400 for facilitating network triggered route optimized mobile communication in accordance with embodiments of the present invention. Apparatus 1400 incorporates memory 1402 for storing program modules configured to manage a half-duplex relay node. Data processor 1410 executes the program modules. Module 1404 provides a communication interface to receive a downlink message containing control data over a backhaul network. Module 1406 utilizes a data processor to reference a control specification that determines a timing configuration for responding to the control data received over the backhaul network. Apparatus 1400 may also incorporate module 1408 providing a communication interface to transmit a response message on the uplink over the backhaul network. The timing configuration may support both 10 ms and 8 ms wireless timing configurations.

The timing configurations are particularly important when providing backward compatibility for older equipment. One area that can be affected is the hybrid automatic repeat request (H-ARQ) operating in a TDD environment. Backward compatibility may be supported by both asymmetric and symmetric downlink and uplink subframe allocations. When operating in a frequency division duplex (FDD) environment, a simple 4 ms rule is followed. The 4 ms rule provides that on the downlink, there is a 4 ms spacing between PDSCH and ACK/NAK frames. On the uplink, there is a 4 ms spacing between the PDCCH/PHICH and PUSCH with another 4 ms spacing between the PUSCH and PDCCH/PHICH. In a TDD environment, H-ARQ timing is not so straightforward. However, the minimum 4 ms rule is always observed. In an LTE system, extra care has been taken in the H-ARQ timing design to minimize H-ARQ delay and to balance the load between the downlink and uplink subframes.

In a half-duplex relay system, only implicit uplink backhaul configuration is provided for FDD systems. There is an implicit 4 ms based bundling between the downlink and uplink backhaul subframes. This 4 ms bundling is aligned with the H-ARQ timing such that there is minimum impact on the access link for legacy user equipment. This is accomplished by ensuring that for each PDSCH transmission on the access link, and uplink subframe for ACK/NAK feedback is available 4 ms later. Additionally, for each scheduled PUSCH transmission, an uplink subframe can be made available, if possible, 4 ms after the PDCCH. In the case of retransmissions, a retransmission may be handled either by the PHICH (in either regular or MBSFN subframes) or by the PDCCH, where the former can be used to suspend the PUSCH transmission if needed. These measures provide for a controlled affect on the backhaul H-ARQ design.

Careful design of the H-ARQ timing for the half-duplex relay is required so that impact on the access link is minimized. Minimizing effect on the access link maximizes backward compatibility for legacy systems over the access link. Meeting these goals requires that specific rules be observed for TDD H-ARQ timing and backhaul subframe configuration. At least one backward compatible downlink H-ARQ process and one backward compatible uplink H-ARQ process in the access link should be provided. This compatibility is with respect to the timing between PDSCH and ACK/NAK, the PDCCH/PHICH and PUSCH, and PUSCH and PDCCH/PHICH.

At the half-duplex relay, there may exist a minimum set of subframes that should be used for the access link to ensure backward compatible operations. As an example, for TDD, downlinks subframes {0, 1, 5, 6} may be reserved for the access link. In order to ensure at least one backward compatible H-ARQ process, an uplink subframe can be chosen for the access link, associated with one or more downlink subframes in the set {0, 1, 5, 6} based on backward compatible DL H-ARQ and/or UL H-ARQ timing. Such set of subframes can be the minimum set of subframes for access link operation. The complementary set of subframes of the minimum set can be the maximum set of subframes for backhaul link operation.

When removing or adding a subframe from the backhaul, priority is given to the subframe providing the greatest benefit to the access link, and to a lesser extent, the minimum impact to the backhaul link. If no benefit to the access link is produced, then consideration should be given to removing or adding a subframe that minimally impacts the access link and provides maximum benefit to the backhaul link, in terms of the downlink/uplink H-ARQ timing.

When a downlink subframe is removed from the backhaul, the subframe selected is the subframe that is most compatible with the uplink access frame in the access link. For this purpose, computability is defined in terms of the H-ARQ timing between the downlink PDSCH and the uplink ACK/NAK, and/or between the downlink PDCCH and the uplink PUSCH.

When an uplink subframe is removed from the backhaul, the subframe removed is selected on the basis of removing the subframe that is most compatible with the downlink subframes in the access link. Once again, compatibility is defined in terms of the H-ARQ timing between the downlink PDSCH and the uplink ACK/NAK, and/or between or between the downlink PDCCH and the uplink PUSCH. When determining which subframe to remove, other factors such as balancing ACK/NAK overhead or PDCCH overhead may also be taken into consideration. Not all possible configurations may be supported, and in making the determination of which subframes to remove additional factors may also be considered.

The additional factors considered may include: disallow extreme imbalance on any link, that is, a downlink to uplink ratio greater than 4:1 on a link may be disallowed; an upload heavy combination on any link may also be disallowed, if possible. In addition, extreme imbalance between the backhaul and the access links in terms of the ratio between the downlink and uplink may also be disallowed. As an example, a 5:1 uplink ratio in the access link with 2:2 downlink to uplink subframes in the backhaul link may be excluded.

Figure 15:
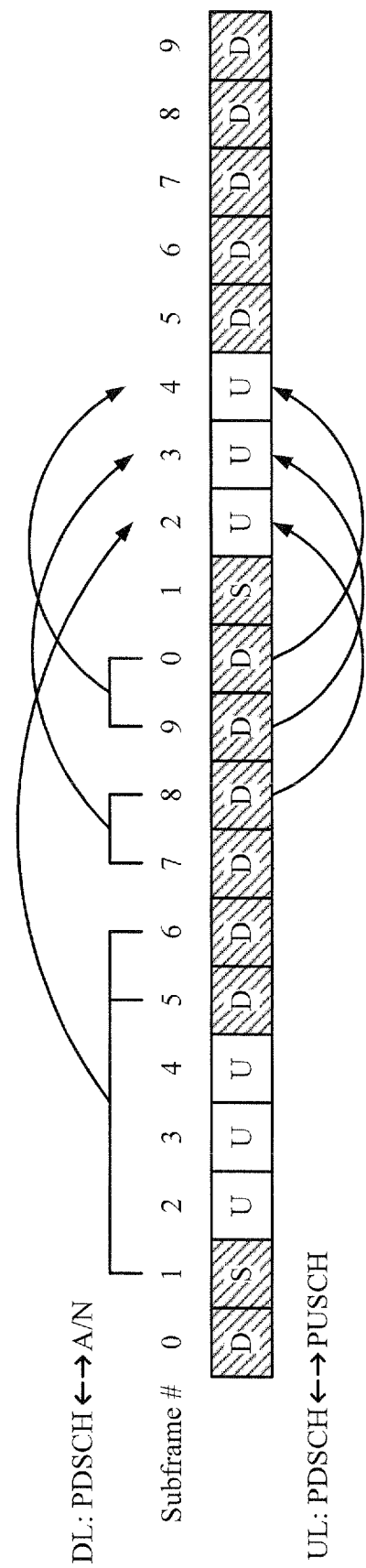
FIG. 15 depicts the H-ARQ timing for a TDD configuration.

FIG. 15 illustrates determining the subframes to be removed consistent with the balancing rules discussed above. FIG. 15 also illustrates the H-ARQ timing for a TDD configuration. Looking at FIG. 15 from the downlink H-ARQ timing perspective, the following combinations are available:

{1, 5, 6}+{2}, {7, 8}+{3}, and {9, 0}+{4}

Looking at FIG. 15 from the uplink H-ARQ timing perspective, with respect to PDCCH and PUSCH, the following combinations are available:

{8}+{2}, {9}+{3}, and {0}+{4}

Considering both the uplink and downlink H-ARQ timing, it should be noted that since the relay node must utilize the MBSFN subframes for the downlink backhaul, subframes {0, 1, 5, 6} must belong to the access link. Therefore, in order to provide at least one backward compatible downlink H-ARQ process, at least the following subframes are needed for the access link:

{1, 5, 6}+{2}+{0}, or {0}, +{4}+{1, 5, 6}

In order to provide at least one backward compatible uplink H-ARQ process, at least with respect to PDCCH and PUSCH, there must be at least the following subframes for the access link:

{0}+{4}+{1, 5, 6}

Therefore, combining the two considerations above, the minimum set of subframes for the access link should be, and the maximum set of subframes for the backhaul link:

Minimum set for access link: $S_{min.\ AL}=\{0, 1, 4, 5, 6\}$, which results in a downlink to uplink ratio of 4:1.

The corresponding maximum set for the backhaul link: $S_{min.\ BH}=\{2, 3, 7, 8, 9\}$, which results in a downlink to uplink ration of 3:2.

In order to support other backhaul subframe configurations, some downlink or uplink subframes need to be removed from the max set $S_{max\ BH}$. In selecting the subframes to be removed care must be taken to avoid configurations that are uplink heavy or extreme downlink to uplink ratios, such as 5:1. In this case, removal of one downlink subframe from $S_{max\ BH}$ is not preferred since this creates a 5:1 ratio in the access link, thus violating a TDD H-ARQ rule.

To remove one uplink subframe from $S_{max\ BH}$ the following must be taken into account:

{2} is linked to {1, 5, 6} in $S_{min, AL}$
{3} is not linked to any downlink subframes in $S_{min, AL}$
Therefore, it is preferable to remove {2} from $S_{max, AL}$. In order to provide a 3:1 configuration on the backhaul link, the preferred configuration is:

BH (3:1): $S_{3:11, BH}$={3, 7, 8, 9}, which is complemented by AL (4:2): $S_{4:2, AL}$={0, 1, 2, 4, 5, 6}.

In order to remove one downlink subframe from $S_{3:1, BH}$ three downlink subframes, 7, 8, and 9 must be considered and evaluated. Evaluating subframes 7, 8, and 9 produces the results below:

{7} is not linked to any subframe $S_{4:2, AL}$
{8} is linked to {2} in subframe $S_{4:2, AL}$ from the perspective of uplink timing.
{9} is linked to {4} in $S_{4:2, AL}$ from the perspective of downlink timing. At this point, it is apparent that {7} should not be removed from $S_{3:1, BH}$. Next, {8} and {9} are evaluated.
{9} is linked to {3} in $S_{3:1, BH}$ from the uplink timing perspective and therefore, is backward compatible with the uplink H-ARQ in the backhaul.

At this point there is one backward compatible downlink H-ARQ process in the backhaul link, namely, {7}+{3}. As a result, an additional combination of {8}+{3} is not critical. Therefore, the decision should be made to remove {8} from $S_{3:1, BH}$. This results in a 2:1 configuration in the backhaul of:

BH (2:1): $S_{2:1BH}$={3, 7, 9}, which is complemented on the access link by:

AL (5:2): $S_{5:2, AL}$={0, 1, 2, 4, 5, 6, 8}.

The next step is to remove another downlink subframe from the set $S_{5:2, AL}$. At this point it is apparent that {7} is not linked to any subframe in $S_{5:2, AL}$ and {9} is linked to {4} in $S_{5:2, AL}$ from the downlink timing perspective. As a result, it is preferable to remove {9} from $S_{2:1BH}$, which results in:

BH (1:1): $S_{1:1, BH}$={3, 7}, which is complemented by AL (6:2): $S_{6:2, AL}$={0, 1, 2, 4, 5, 6, 8, 9}.

The resulting backhaul subframe configuration for the TDD configuration described above is summarized in FIG. 19 A further embodiment is suitable for use with advanced user equipment that is aware of the backhaul subframe configuration, or is aware of the set of subframes for the access link operation. This provides more efficient ACK/NAK feedback as well as power savings. In this embodiment, the user equipment is aware, via broadcast or unicast message, of the backhaul or access subframe configuration. As an example, 2 bits of information may be used to indicate which configuration from FIG. 19 is used by a relay node. The details are shown below:

00: Un subframe configuration index 0
01: Un subframe configuration index 1
10: Un subframe configuration index 2
11: Un subframe configuration index 3

User equipment that knows the backhaul or access link subframe configuration provides better ACK/NAK feedback in the access link. Instead of using a fixed downlink subframe bundling window driven by the TDD configuration, TDD subframe bundling windows may be driven by both the TDD configuration and the backhaul or access link subframe configuration index. With knowledge of the backhaul or access link configuration under the TDD configuration under FIG. 19, the downlink and uplink subframes may be bundles as shown below.

If index 0 {1, 5, 6}+{2}, {8, 9, 0}+{4}
Or alternatively, {1, 5, 6}+{2}, {8}, {9, 0}+{4}
If index 1 {1, 5, 6}+{2}, {8, 0}+{4}
Or alternatively {1, 5, 6}+{2}, {8}, {0}+{4}
If index 2 {1, 5, 6}+{2}, {0}+{4}
If index 3 {1, 5, 6}, {0}+{4}
Or alternatively, {1, 5, 6, 0}+{4}

In operation, the method operates to provide wireless communication at a half-duplex node that is operating in TDD mode. The node receives configuration of a first set of subframes for a first link communication. The set of subframes contains at least one downlink subframe and at least one uplink subframe. Once the first set of subframes is determined, a second set of subframes for a second link communication is determined.

This second set of subframes includes at least one backward compatible downlink hybrid automatic repeat request process and at least one backward compatible uplink hybrid automatic repeat request process. The backward compatible hybrid automatic repeat request processes support both legacy operations and equipment.

Once the first and second sets of subframes have been determined, communication with a first set of nodes using the first link and first set of subframes begins. The communication to a legacy node uses the backward compatible downlink hybrid automatic repeat request process and the at least one backward compatible uplink hybrid automatic repeat request process.

A further embodiment of the method described above provides that the half-duplex node may be a relay node, used to assist communication between nodes that may be out of reach. When the half-duplex node is a relay node, the first link is a backhaul link and the second link is an access link.

An additional embodiment allows the first set of nodes to be comprised of only one node and the one node is a donor enhanced Node B. This may be useful when only one legacy node requires support. A further embodiment provides that the backward compatible hybrid automatic repeat request process satisfies the downlink and uplink timing requirements of the Long Term Evolution (LTE) Release 8 specification when the node is operating in TDD mode.

Further additional embodiment provide for specific relationships between the first and second sets of subframes. The second set of subframes may be complementary to the first set of subframes and the union of the two sets that comprise all of the subframes. A third set of subframes may also be provides. If a third set of subframes is provided, at least one node in the second set of nodes must be informed of the existence of the third set of subframes. The third set of subframes may also be a subset of the second set of subframes, or may be identical to the second set of subframes. When used, the third set of subframes is used for communication over the second link, which may be the access link.

When the third set of subframes is provided, a further embodiment employs at least one non-backward compatible hybrid automatic repeat request process. This process is used for at least one node that uses the third set of subframes for the second link communication.

An alternate embodiment provides for ACK/NAK feedback in an uplink subframe. This feedback is provided in response to the downlink transmission and is used to discount subframes that are not included in the third set of subframes.

In order to maintain efficient operation of the wireless communication system and to distribute the load, ratios between the downlink and uplink subframe are established. In providing for these ratios, the intent is to try to avoid uplink heavy or extremely unbalanced downlink to uplink ratios, which cause delays and inefficiencies, and increased power consumption by nodes. In one embodiment, the ratio of downlink subframes to the uplink subframes in the first set is not greater than 4. In this embodiment, a set of subframes that results in a ratio of 5:1 would not be permitted. An alternative embodiment specifies that the ratio of the downlink subframes to the uplink subframes in the first set is no less than 1. A further alternate embodiment provides that the ration of the downlink subframes to the uplink subframes in the second set is not greater than 4:1.

In composing the first set of subframes alternate subframes may be used. These subframes may be multicast broadcast single frequency network subframes (MBSFN) sent at the half-duplex node.

An additional embodiment of the present invention allows the method described above to operate at an enhanced Node B to a half-duplex node. Enhanced Node Bs are used in conjunction with LTE Release 8. In operation a first set of subframes is generated for a first link communication. This first set of subframes contains at least one downlink subframe and at least one uplink subframe. A second set of subframes for a second link communication is also determined. In this second set of subframes there is at least one backward compatible downlink hybrid automatic repeat request process and at least one backward compatible uplink hybrid automatic repeat request process that require the second set of subframes. The enhanced Node B then communicates with the half-duplex node using the first link and the first set of subframes.

The method described above may also be performed with the half-duplex node being a relay node, the first link is a backhaul link, and the second link is an access link.

A further embodiment provides that the half-duplex node communicates with a second set of nodes using the second link and the second set of subframes. In this embodiment, the second set of subframes is used and the communication to a legacy node uses the at least one backward compatible downlink hybrid automatic repeat request process and the at least one backward compatible uplink hybrid automatic repeat request process.

An apparatus to perform the method described above includes a transmitter for transmitting the configuration of a first set of subframes for the first link communication. This first set of subframes contains at least one downlink subframe and at least one uplink subframe. The apparatus also includes a processor that determines a second set of subframes for a second link communication. The second set of subframes includes at least one backward compatible downlink hybrid automatic repeat request process and at least one backward compatible uplink hybrid automatic repeat request process that requires the second set of subframes. The transmitter is also used for communicating with the half-duplex node using the first link and the first set of subframes.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication at a half-duplex node operating in TDD mode, comprising;
    receiving a configuration of a first set of subframes for a first link communication selected among a plurality of configurations, wherein the first set of subframes contains at least one downlink subframe and at least one uplink subframe;
    determining a second set of subframes for a second link communication, wherein there is at least one backward compatible downlink hybrid automatic repeat request process and at least one backward compatible uplink hybrid automatic repeat request process requiring the second set of subframes;
    communicating with a first set of nodes using the first link and the first set of subframes; and
    communicating with a second set of nodes using the second link and the second set of subframes, wherein the communication to a legacy node uses the at least one backward compatible downlink hybrid automatic repeat request process and the at least one backward compatible uplink hybrid automatic repeat request process,
    wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

2. The method of claim 1, wherein the half-duplex node is a relay node, the first link is a backhaul link and the second link is an access link.

3. The method of claim 1, wherein the first set of nodes comprises one node and is a donor enhanced node B.

4. The method of claim 1, wherein a backward compatible hybrid automatic repeat request process including the at least one backward compatible downlink hybrid automatic repeat request process and the at least one backward compatible uplink hybrid automatic repeat request process satisfies the downlink and uplink timing requirements of the long term evolution Release 8 operating in TDD mode.

5. The method of claim 1, wherein the second set of subframes is complementary to the first set of subframes such that there is no overlapping subframe between the first set of subframes and the second set of subframes and a union of two sets comprises all subframes.

6. The method of claim 1, further comprising:
    informing at least one node in the second set of nodes of a third set of subframes to be used for communication over the second link.

7. The method of claim 6, further comprising:
    employing at least one non-backward compatible hybrid automatic repeat request process for the at least one node based on the third set of subframes for the second link communication.

8. The method of claim 6, wherein the third set of subframes is a subset of the second set of subframes.

9. The method of claim 6, wherein the third set of subframes is identical to the second set of subframes.

10. The method of claim 6, wherein an ACK/NAK feedback in an uplink subframe provided in response to downlink transmission discounts subframes not contained in the third set of subframes.

11. The method of claim 1, wherein the ratio of the downlink subframes to the uplink subframes in the first set is not greater than 4.

12. The method of claim 1, wherein the ratio of the downlink subframes to the uplink subframes in the first set is no less than 1.

13. The method of claim 1, wherein the ratio of the downlink subframes to the uplink subframes in the second set is not greater than 4.

14. The method of claim 1, wherein the subframes in the first set comprise multicast broadcast single frequency network (MBSFN) at the half duplex node.

15. A method for wireless communication at an enhanced Node B operating in TDD mode to a half-duplex node, comprising;
    generating a plurality of configurations including a configuration of a first set of subframes for a first link communication, wherein the first set of subframes contains at least one downlink subframe and at least one uplink subframe;
    determining a second set of subframes for a second link communication, wherein there is at least one backward compatible downlink hybrid automatic repeat request process and at least one backward compatible uplink hybrid automatic repeat request process requiring the second set of subframes;
    communicating with the half-duplex node using the first link and the first set of subframes,
    wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

16. The method of claim 15, wherein the half-duplex node is a relay node, the first link is a backhaul link and the second link is an access link.

17. The method of claim 15, wherein the half duplex node communicates with a second set of nodes using the second link and the second set of subframes wherein the communication to a legacy node uses the at least one backward compatible downlink hybrid automatic repeat request process and the at least one backward compatible uplink hybrid automatic repeat request process.

18. The method of claim 15, wherein a backward compatible hybrid automatic repeat request process including the at least one backward compatible downlink hybrid automatic repeat request process and the at least one backward compatible uplink hybrid automatic repeat request process satisfies the downlink and uplink timing requirements of the long term evolution Release 8 operating in TDD mode.

19. The method of claim 15, wherein the second set of subframes is complementary to the first set of subframes such that there is no overlapping subframe between the first set of subframes and the second set of subframes and a union of two sets comprises all subframes.

20. The method of claim 15, further comprising:
    informing at least one node in the second set of nodes of a third set of subframes to be used for communication over the second link.

21. The method of claim 20, further comprising:
    employing at least one non-backward compatible hybrid automatic repeat request process for the at least one node based on the third set of subrames for the second link communication.

22. The method of claim 20, wherein the third set of subframes is a subset of the second set of subframes.

23. The method of claim 20, wherein the third set of subframes is identical to the second set of subframes.

24. The method of claim 20, wherein an ACK/NAK feedback in an uplink subframe provided in response to downlink transmission discounts subframes not contained in the third set of subframes.

25. The method of claim 15, wherein the ratio of the downlink subframes to the uplink subframes in the first set is not greater than 4.

26. The method of claim 15, wherein the ratio of the downlink subframes to the uplink subframes in the first set is no less than 1.

27. The method of claim 15, wherein the ratio of the downlink subframes to the uplink subframes in the second set is not greater than 4.

28. The method of claim 1, wherein the subframes in the first set comprise multicast broadcast single frequency network (MBSFN) at the half-duplex node.

29. An apparatus for wireless communication at a half-duplex node operating in TDD mode, comprising:
    a receiver for receiving a configuration of a first set of subframes for a first link communication selected among a plurality of configurations, wherein the first set of subframes contains at least one downlink subframe and at least one uplink subframe:
    a memory for storing the configuration of the first set of subframes;
    a processor for determining a second set of subframes for a second link communication, wherein there is at least one backward compatible downlink hybrid automatic repeat request process and at least one backward compatible uplink hybrid automatic repeat request process requiring the second set of subframes;
    a transmitter for communicating with a first set of nodes using the first link and the first set of subframes and
    for communicating with a second set of nodes using the second link and the second set of subframes, wherein the communication to a legacy node uses the at least one backward compatible downlink hybrid automatic repeat request process and the at least one backward compatible uplink hybrid automatic repeat request process,
    wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

30. An apparatus for wireless communication at an enhanced Node B operating in TDD mode to a half-duplex node, comprising:
- a transmitter for transmitting a configuration of a first set of subframes for a first link communication selected among a plurality of configurations, wherein the first set of subframes contains at least one downlink subframe and at least one uplink subframe; and
- a processor for determining a second set of subframes for a second link communication, wherein there is at least one backward compatible downlink hybrid automatic repeat request process and at least one backward compatible uplink hybrid automatic repeat request process requiring the second set of subframes,
- wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

31. An apparatus for wireless communication at a half-duplex node operating in TDD mode, comprising:
- means for receiving a configuration of a first set of subframes for a first link communication among a plurality of configurations, wherein the first set of subframes contains at least one downlink subframe and at least one uplink subframe;
- means for determining a second set of subframes for a second link communication, wherein there is at least one backward compatible downlink hybrid automatic repeat request process and at least one backward compatible uplink hybrid automatic repeat request process requiring the second set of subframes;
- means for communicating with a first set of nodes using the first link and the first set of subframes; and
- means for communicating with a second set of nodes using the second link and the second set of subframes, wherein the communication to a legacy node uses the at least one backward compatible downlink hybrid automatic repeat request process and the at least one backward compatible uplink hybrid automatic repeat request process,
- wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

32. A non-transitory computer-readable medium comprising instructions for wireless communication at a half-duplex node operating in TDD mode, which when executed by a processor causes the processor to:
- receive a configuration of a first set of subframes for a first link communication selected among a plurality of configurations, wherein the first set of subframes contains at least one downlink subframe and at least one uplink subframe;
- determine a second set of subframes for a second link communication, wherein there is at least one backward compatible downlink hybrid automatic repeat request process and at least one backward compatible uplink hybrid automatic repeat request process requiring the second set of subframes;
- communicate with a first set of nodes using the first link and the first set of subframes; and
- communicate with a second set of nodes using the second link and the second set of subframes, wherein the communication to a legacy node uses the at least one backward compatible downlink hybrid automatic repeat request process and the at least one backward compatible uplink hybrid automatic repeat request process,
- wherein the plurality of configurations include a configuration of an initial set of subframes for the first link communication and a configuration of at least one additional set of subframes generated by removing from the initial set at least one of a downlink subframe most compatible with an uplink subframe in the second link communication or an uplink subframe most compatible with a downlink subframe in the second link communication, wherein compatibility is with respect to timing between a downlink channel and an uplink channel.

* * * * *